United States Patent Office 3,327,345
Patented June 27, 1967

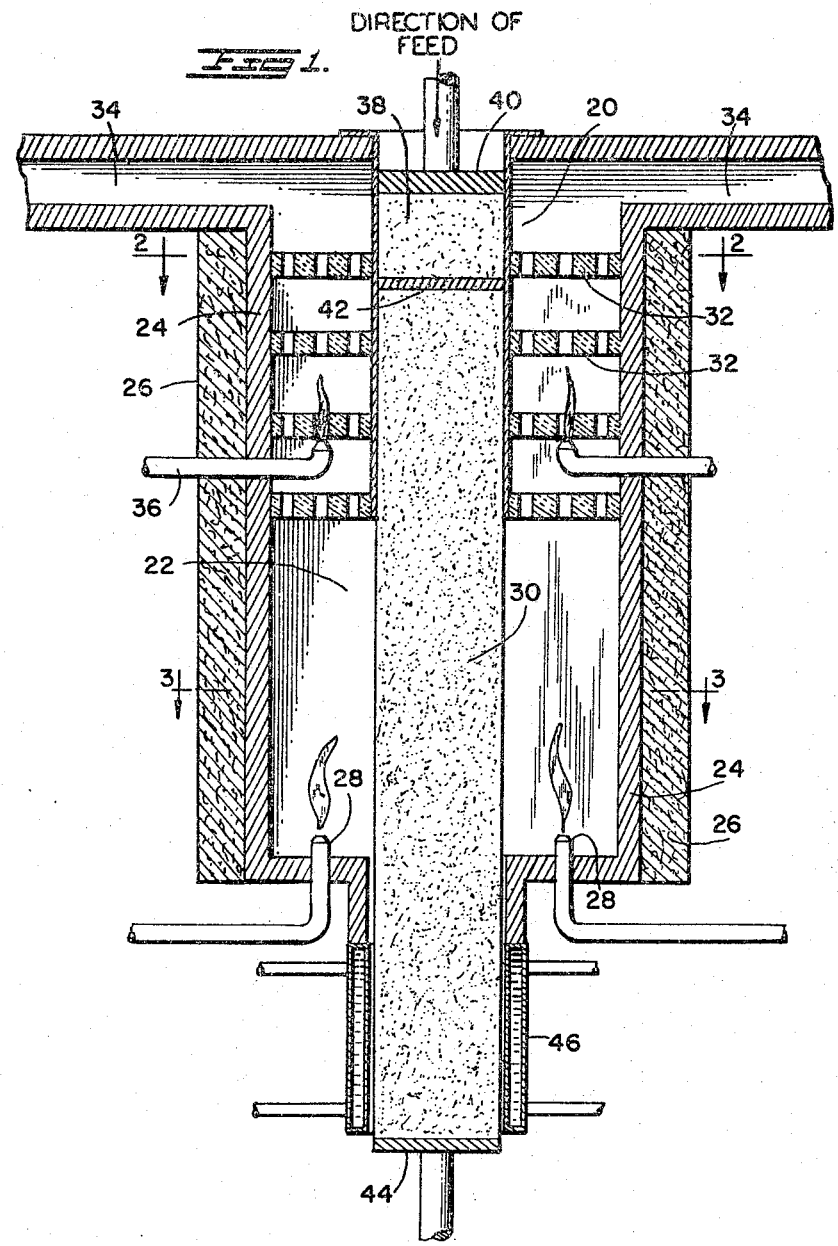

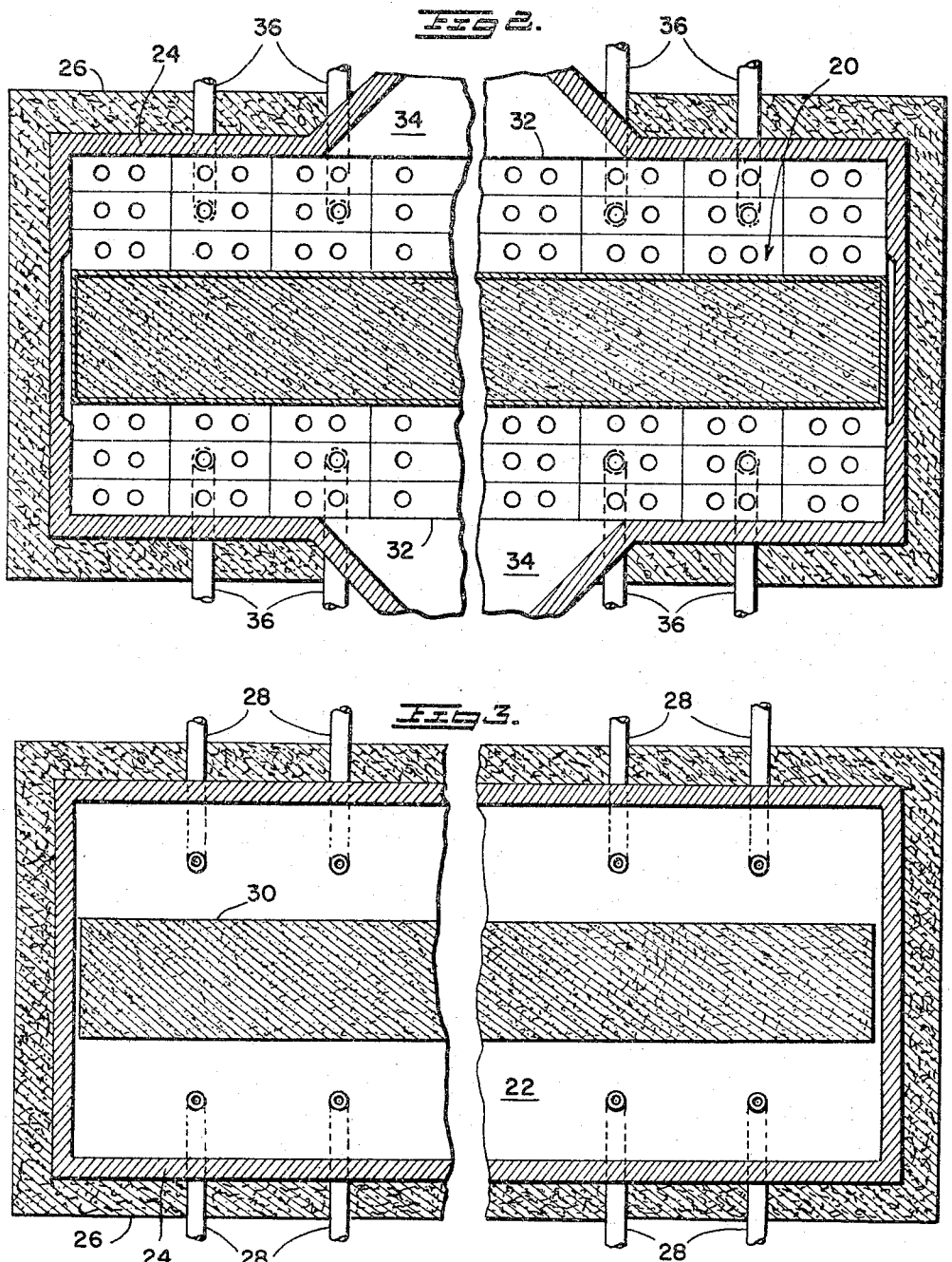

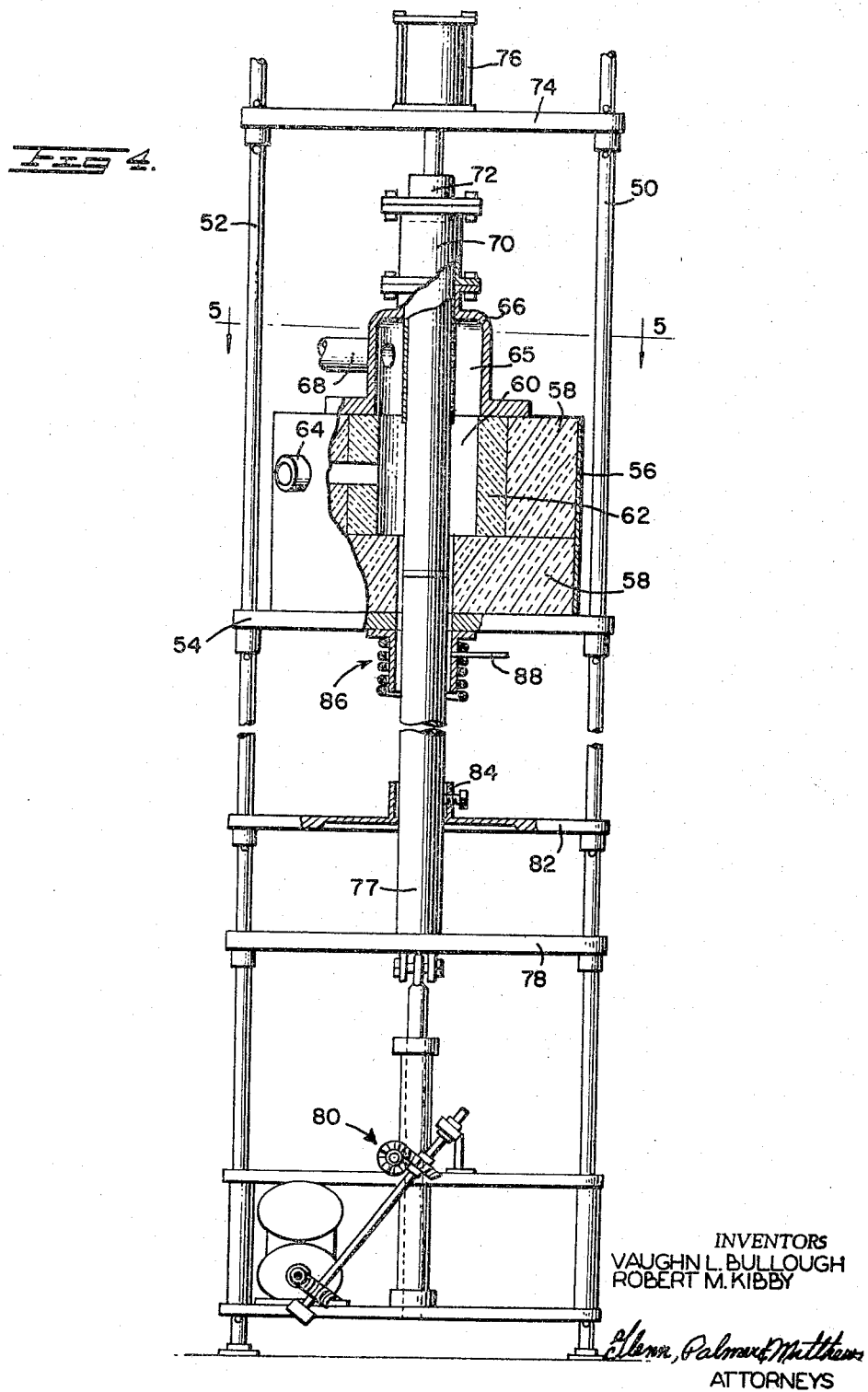

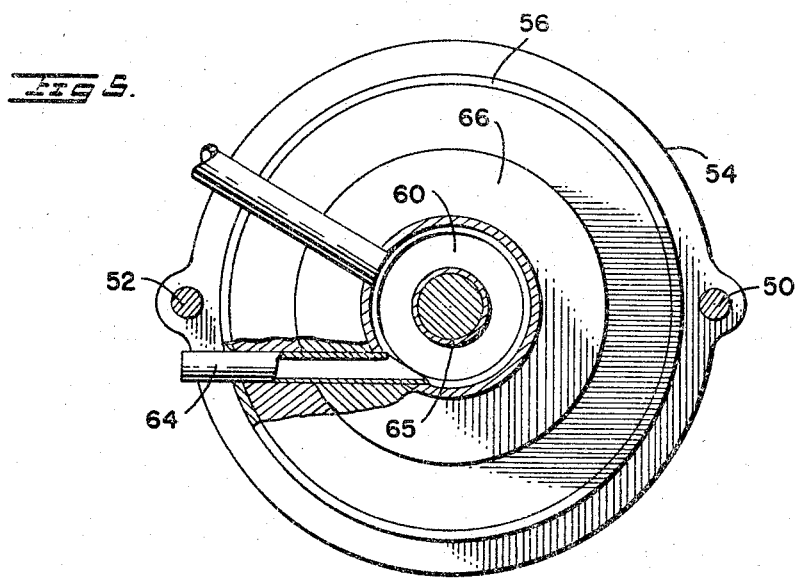
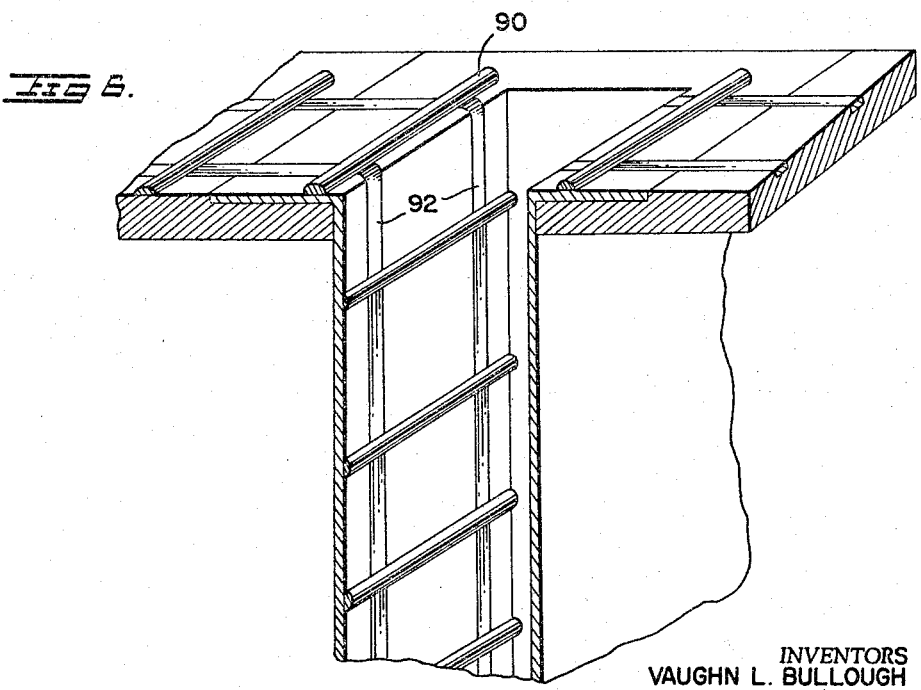

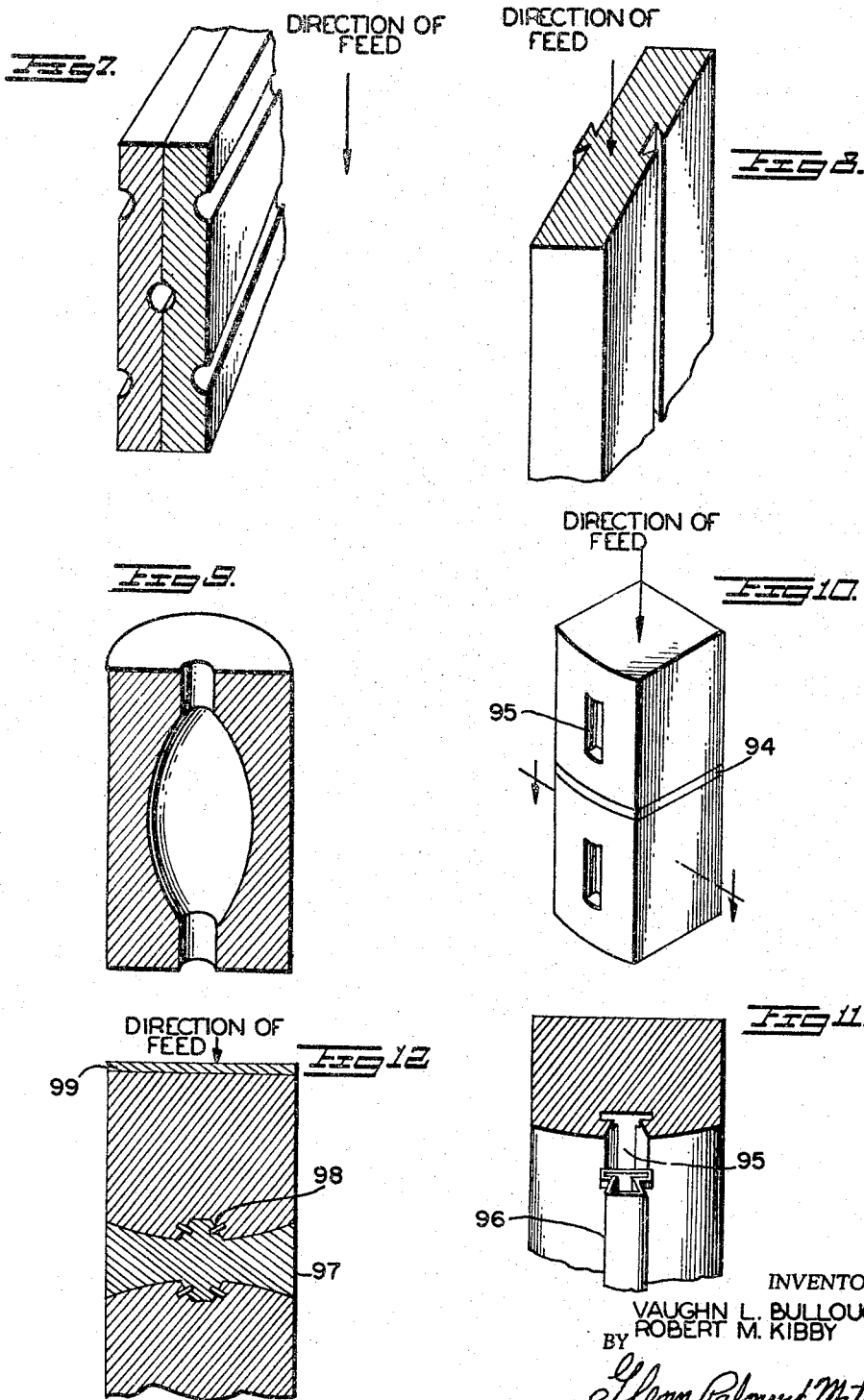

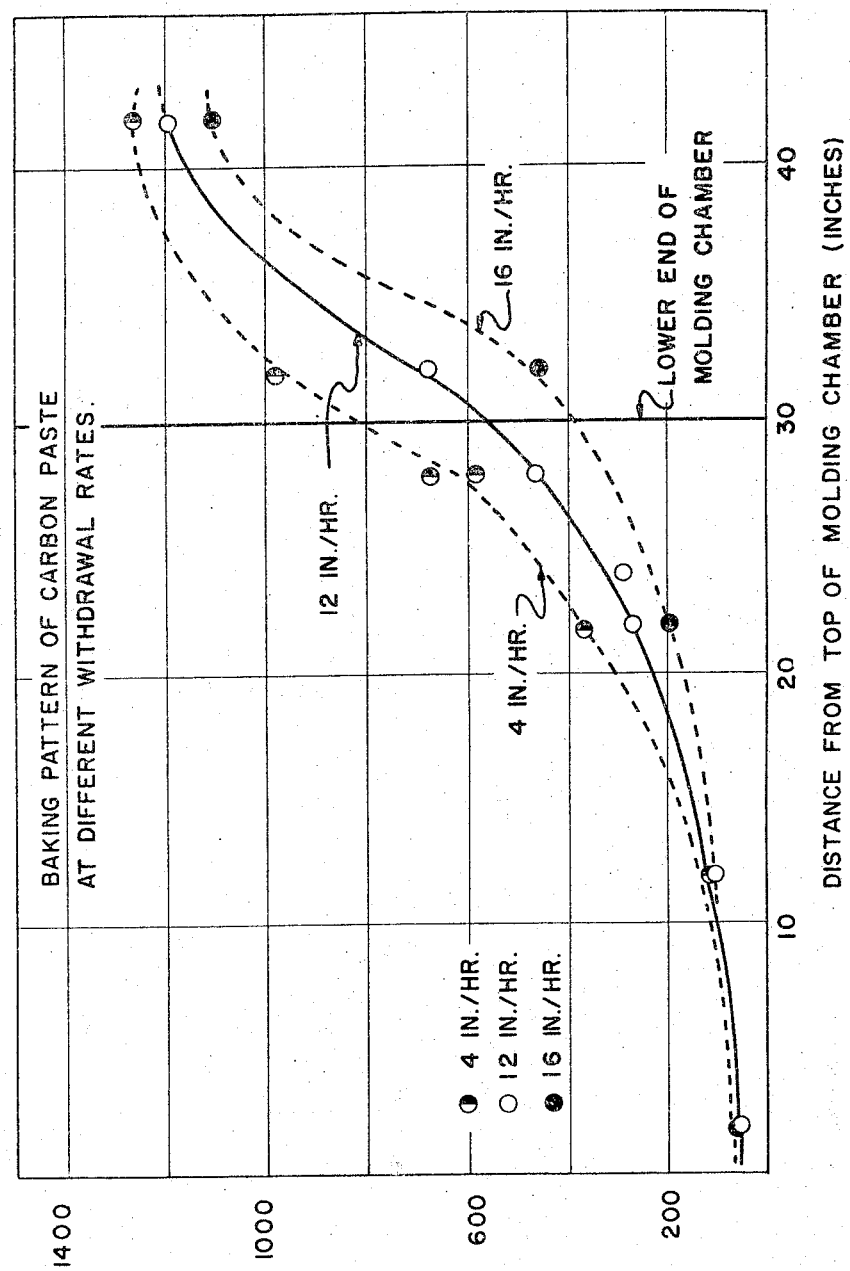

3,327,345
MANUFACTURE OF SHAPED CARBON BODIES
Vaughn L. Bullough and Robert M. Kibby, Florence, Ala., assignors to Reynolds Metals Company, Richmond, Va., a corporation of Delaware
Original application Mar. 1, 1963, Ser. No. 262,130. Divided and this application June 22, 1966, Ser. No. 576,162
6 Claims. (Cl. 18—12)

ABSTRACT OF THE DISCLOSURE

Apparatus for making baked carbon shapes, including a burner-fired baking chamber and a pass-through molding device arranged to discharge into the baking chamber. Means are provided for heating and shaping formable material in the molding device, after which the shaped material is exposed directly to hot combustion gases in the baking chamber.

---

This application is a division of application Ser. No. 262,130 filed Mar 1, 1963 (now U.S. Patent 3,286,003).

This invention relates to a novel system for producing shaped carbon bodies and, more particularly, to a method of molding and baking carbon shapes in a substantially continuous operation, as well as to apparatus for such uses and other purposes. The invention is also concerned with an improved method for the manufacture of prebaked carbon for use in alumina reduction cells.

Two types of carbon anodes are commonly employed in such cells, known respectively as prebaked anodes and as self-baking continuous (Soderberg) anodes. The prebaked anodes are conventionally manufactured in batch operations by mixing coke with a carbonaceous binder such as pitch; molding the mixture into the desired shape; and then baking the molded shape at high temperature to carbonize the binder and produce a dense, strong, electrically conductive product. The self-baking electrode is produced in the electrolytic cell, a similar carbonaceous mixture being baked by process heat to provide a mass of carbon extending into the cell.

The prebaked and the self-baking types of anodes each possess recognized advantages and drawbacks. The conventional aluminum cell prebake anode includes a number of prebaked carbon slabs or blocks, having dimensions ranging from about 16" x 20" x 13" to about 20" x 32" x 13", with a steel connecting pin held in the top by a ring of cast iron, the pin serving as a connection to the current source. Anodes of this type are operated typically at a nominal current density of 7 to 8 amperes per square inch, based upon bottom surface area of a new block, at an anode-to-cathode distance of 1¾" to 2". Resistance losses in the pin and carbon assembly average about 0.3 to 0.5 volt. From 15% to 20% of the carbon is consumed by air oxidation, about 35% is removed as butts, and the balance is consumed in the electrochemical reaction; replacement with a fresh anode takes place at about seven day intervals. The Soderberg anode usually consists of a single mass of carbon, with iron pins embedded in the mass for current connection. These anodes are ordinarily operated at about 4 to 6 amperes per square inch nominal current density, with an anode-to-cathode distance of 2" to 2¼". Resistance losses average about 0.5 volt. No butts need to be handled, but the iron current connecting pins must be removed and reinserted periodically as the carbon mass is consumed. The anode is formed in situ by adding an unbaked mixture of coke and pitch at intervals to the top of the anode mass, the mixture being carbonized by the heat generated in the cell. In the Soderberg process, carbon travel is governed by the rate of consumption in the cell, and the process is further limited by the relatively narrow range of temperature conditions which can be tolerated in efficient operation of the electrolytic cell.

Methods of producing prebaked carbon shapes presently in use ordinarily involve molding a carbonaceous mixture into the desired shape, loading the green carbon bodies into a ring-type furnace, packing the furnace pits with coke to support the carbon bodies and to protect against oxidation, and baking at a temperature gradually increasing to about 750°–800° C. for about 5 days. Thereafter, the carbon bodies are carefully heated further to about 1100° C. during a curing period of about 40 hours. If the rate of preheating is accelerated, the quality of the carbon is impaired. At the completion of the baking period, the furnace is cooled and the carbon and packing material are removed. This thermal cycling is particularly undesirable because it causes rapid deterioration of the furnaces, thereby imposing severe limitations on the materials of construction. In addition, the baking cycle from loading to unloading usually requires several weeks. Much labor is required to pack and unpack the carbon bodies, and the baking pits represent high initial investment cost.

The present invention eliminates many costly and cumbersome operations of the conventional processes, providing simplified operation and greatly reduced baking times. In accordance with the invention, we have found it possible to mold carbonaceous material into the desired shape and bake the molded shape in a substantially continuous operation requiring only a few hours. This is accomplished by initially confining the material in the desired configuration, and treating the confined material to set the binder. This causes the material to become self-supporting to the extent that the resulting rigid shape may be withdrawn and baked at elevated temperature to carbonize the structure, without the necessity for lateral support during the baking operation. A heating and shaping zone is conveniently provided by a pass-through molding chamber having heat-conductive walls and a heating jacket for controlling the temperature of the walls. The baking operation may be combined with the molding step to provide continuous processing, by discharging the rigid shape from the molding device directly into the baking chamber.

As a starting material, there may be employed any suitable carbonizable material comprising a carbonaceous aggregate in admixture with a thermosetting binder, preferably a carbonizable anode paste of the type conventionally used for making electrodes. Material of this kind includes an aggregate such as petroleum coke, pitch coke, and the like. As a binder for the paste there may be used, for example, coal tar or coke oven pitch or petroleum pitch. The proportion of pitch to carbonaceous material will be generally above 10% and up to about 35% by weight, but preferably about 20–28% for paste mixtures and about 11–16% for mixtures which are to be preformed. The material may be charged to the molding chamber as a paste, as compacted briquettes, or as preformed blocks having substantially the same cross-sectional shape as the final product.

The carbonizable material is passed through an elongated heating and shaping zone, provided, for example, by a metal walled molding chamber of the desired cross-sectional configuration, open at each end. The material is moved continuously through the heating and shaping zone and heated externally. The heating and shaping zone is conveniently disposed vertically, with the mass moving in a downward direction. Moreover, the mass is preferably moved positively by the application of pressure at the entering end of the zone, as, for example, by means of flat platen or ram. The paste material in the heating and shaping zone is supported and restrained at the exit end of the molding chamber by the previously formed rigid mass or carbon, which in turn is supported by a lower platen to control withdrawal at any desired rate of speed. To separate one slab from another, a partition is laid across the top of one batch of paste introduced into the mold, with fresh paste for the next slab being added on top of the partition. This eliminates an expensive operation of sawing the continuous length of carbon for removal from the furnace.

In the heating and shaping zone, the rate of heating is carefully controlled, particularly the rate of increase of temperature of the paste up to about 500° C. Under adequate pressure, a heating period from about 2 to 4 hours, during which the temperature of the material is raised to about 600° C., accomplishes transformation of the paste into a substantially self-supporting rigid shape.

During passage of the paste through the heating and shaping zone, the development of increased density may be promoted by the application of vibration. The passage of the material through the mold may also be facilitated by providing suitable lubrication or a movable sheet metal liner, for example, aluminum sheet, between the carbon paste and the heating wall.

In the next stage of the method, the material emerging from the shaping zone (having acquired rigidity and strength) is treated in a baking zone at a temperature substantially higher than that in the shaping zone. For this purpose the shaped body may be exposed directly to the heating action of a gaseous atmosphere, at a heating rate which may be higher than in the mold section. The finishing temperature may range between about 900° and about 1100° C., or higher. The baked carbon body is then cooled, preferably under non-oxidizing conditions, and removed.

The invention will now be described by reference to the accompanying drawings, in which:

FIG. 1 is a vertical section of apparatus in accordance with the invention;

FIGS. 2 and 3 are views in cross-section along lines 2—2 and 3—3 of FIG. 1;

FIG. 4 is a side elevation, partly broken away in vertical section, of another apparatus embodiment of the invention;

FIG. 5 is a cross-sectional view, partly broken away in horizontal section, along line 5—5 of FIG. 4;

FIG. 6 shows the use of auxiliary apparatus in conjunction with a device of the type illustrated in FIG. 1;

Figure 13:
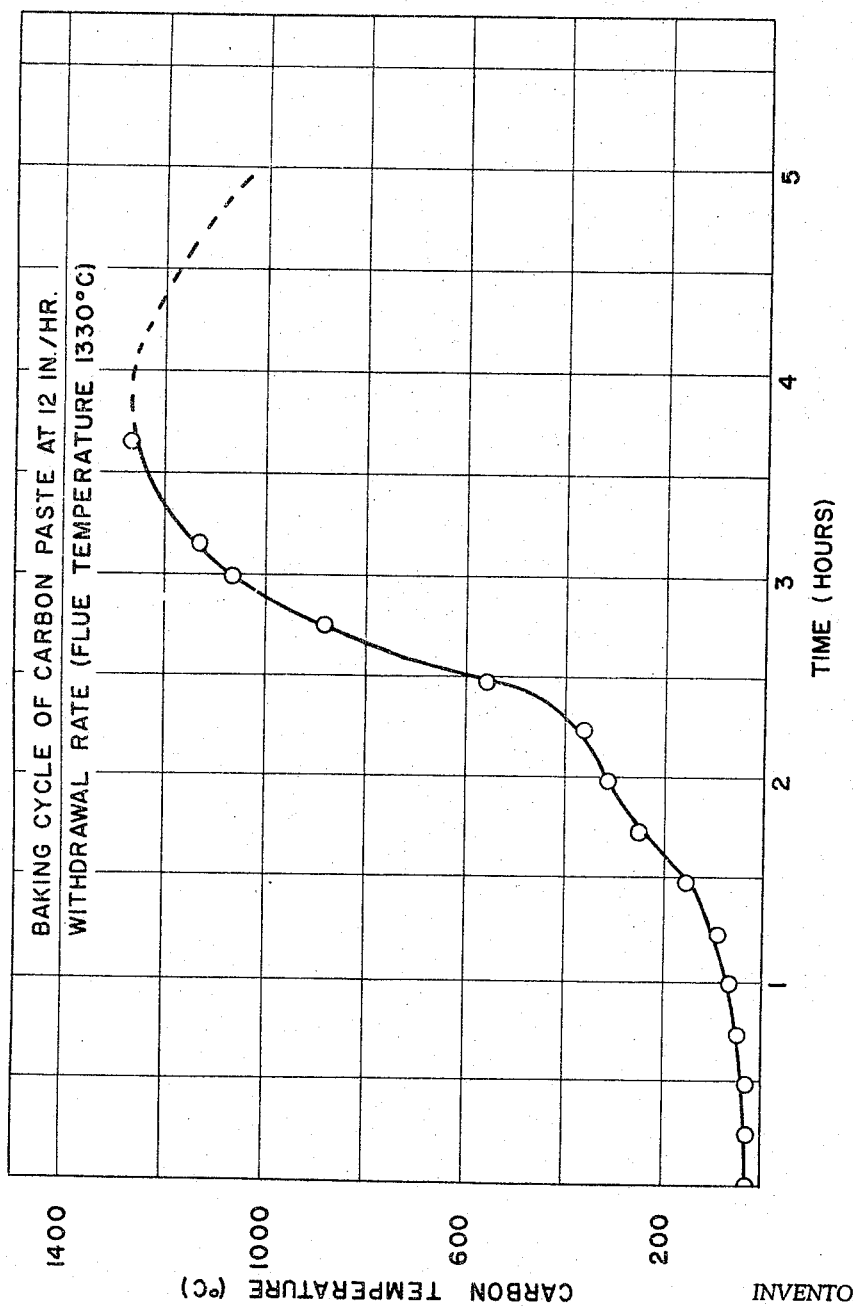

FIGS. 7–12 concern various products which may be produced in accordance with the invention;

FIGS. 13 and 14 are graphs presenting typical process conditions pertaining to a specific example of the invention given below (Example 1).

Referring to FIGS. 1–3 of the drawings, there is depicted a device suitable for producing baked carbon slabs in accordance with the invention. The apparatus includes a sleeve 20 which provides a heating and shaping zone for the carbonaceous feed material. At the outlet of sleeve 20 is a baking chamber 22 through which the rigid slab passes for further heating. Outer walls 24 are covered with insulating layers 26 to retain heat.

Chamber 22 provides a cumbustion zone wherein natural gas, oil, or other suitable fuel is burned to produce a non-oxidizing atmosphere, the heat of combustion being transferred directly to the carbonaceous mass 30. Fuel is introduced into chamber 22 by means of burners 28.

Walls 24 also define a heating jacket for sleeve 20, the combustion gases being passed upwardly through refractory flue element 32 and, thence, to the exhaust channels 34. Additional fuel or air may be introduced via burners 36 adjacent sleeve 20. The sleeve also functions to direct escaping volatile matter into the combustion zone where it is burned to continuously supplement the protective atmosphere.

A charge of carbonaceous paste 38 is introduced into the upper end of the mold, forming a plastic mass in the heating and shaping zone of sleeve 20. A platen 40, fitting into the mold, is placed on top of the charge and moved downwardly to provide positive pressure. An asbestos board 42 is employed to separate one slab from the next.

A lower platen 44 provides longitudinal confinement of the material and is used to control the rate of withdrawal. The baked slab is advantageously passed through a final cooling section, such as water-cooled jacket 46, to reduce its temperature below the oxidation threshold.

FIGS. 4 and 5 illustrate comparable apparatus for the manufacture of baked carbon bodies which are generally cylindrical in shape. The framework comprises a pair of guide rods 50, 52 and several platforms supported upon the guide rods. Platform 54 provides a base for the furnace structure, which includes a furnace shell 56, walls of insulating refractory 58, and a lining 62 of high temperature refractory which defines a baking chamber 60. A burner port 64 affords access for heating the interior of chamber 60.

Mounted above and discharging into the baking chamber is a mold section comprising metal sleeve 65. A cast iron reducing T 66, the side arm of which constitutes an outlet 68 to exhaust the combustion gases, serves as a heating jacket for the sleeve 65. The cylindrical extension 70 provides a charging chamber for introduction of the carbonaceous material. Piston 72 serves as the upper platen to advance the material through the heating and shaping chamber defined by sleeve 65. Uppermost platform 74 supports hydraulic mechanism 76 for actuating piston 72.

Platform 78, which supports the emerging carbon shape 77, is disposed for sliding movement along the guide rods; and mechanism 80 of conventional construction is provided to afford control over its rate of travel. Auxiliary platform 82 includes a clamping device 84 for holding the upper section of carbon while a completed length is being removed from the apparatus.

Immediately beneath the base platform 54, at the furnace outlet, is a cooling unit 86. The inlet tube 88 is also provided for introducing purge gas, if needed, to maintain neutral or reducing atmosphere in the system. A pressure slightly above atmospheric is beneficial in operation, to prevent leakage of air into the combustion chamber.

FIG. 5 shows the disposition of burner port 64 which is advantageously arranged to direct a heating flame tangentially of the carbon shape being baked. This action helps to distribute the heating effect more uniformly throughout chamber 60.

FIGS. 7–12 illustrate various carbon shapes which may be produced in accordance with the invention. As suggested by FIG. 8, complex cross-sectional configurations may be obtained by providing a mold of the desired cross-section in a plane normal to the axis of feed. Interior cavities may also be produced (see FIG. 9) by utilizing a fusible core, as described in an example which follows.

When it is desired to provide transverse grooves in an outer surface of the carbon shape, this may be accomplished by means of inserts which are embedded in the carbonaceous paste before it becomes rigid. As shown in FIG. 6, for example, molding bars 90 are introduced into the mold and advanced through the heating and shaping zone with the paste. The bars may be formed of an expendable material, such as wood, which is capable of holding its shape at temperatures up to the point at which the carbonaceous material becomes set; or refractory inserts may be provided which are reusable. In either case, it may be desirable to utilize a connecting member 92 when accuracy of spacing multiple inserts is necessary. That member may also be consumable, such as fabric webbing, or a more permanent member such as a steel roller chain may be satisfactory employed. As shown in FIG. 7, the provision of transverse grooves in the carbon enables similar slabs to cooperate for receiving metal contacts or connectors.

Block anodes of the type sometimes employed in electrolytic cells can also be manufactured in accordance with the invention. FIGS. 10–12 are illustrative of such products and the way in which they can be produced. A plurality of blocks may be formed in side-to-side relationship, separated by a simple divider element 94 (see FIG. 10). In that case, the mounting socket 95 may be formed by use of individual fusible inserts, such as the tubular aluminum shape 96 shown in FIG. 11. Alternatively, the blocks may be formed in back-to-back relationship (FIG. 12) using a shaped divider element 97 having retractable or fusible inserts 98 to produce mounting recesses. Each pair of such blocks is separated from the adjacent pair by a simple divider element 99.

The following working examples of the invention are to be regarded as illustrative and not as limiting:

*Example 1*

Suitable carbonaceous starting material was prepared by mixing finely divided petroleum coke and coal tar pitch, the resulting plastic mass being formed into paste briquettes for convenience in handling. The briquettes were charged into the upper end of a pass-through molding chamber in a furnace constructed according to the invention (see FIG. 4). A heating and shaping zone was provided by a 6-inch diameter sheet metal sleeve, about 30 inches long, extending approximately 18 inches into the baking chamber. The direct heating zone was about 24 inches long.

Pressure of about 140 p.s.i. was applied downwardly to the charge of paste briquettes, and the temperature of the confined carbonaceous material was increased until the material lowermost in the sleeve reached a temperature of about 500°–600° C. and had become rigid. The withdrawal mechanism was then operated at the desired rate to lower the rigid material into the direct heating zone for completion of the baking operation. Thereafter, the operation proceeded on a continuous basis, with the upper platen being raised periodically to charge more material. Less frequently, according to the desired length of product, partition plates were inserted.

Upon leaving the furnace, the carbon body was passed through a water-cooled sleeve which reduced its temperature to about 180° C. Oxidation control was provided by operating the combustion chamber at above atmospheric pressure, thereby preventing air from entering the entire system (including the cooling section). In this manner, a 6-inch diameter cylindrical carbon body was continuously produced in convenient lengths. FIG. 13 illustrates a typical baking cycle employed, and FIG. 14 shows the carbon temperature for various withdrawal rates as a function of position in the sleeve.

Table I shows the properties developed in the carbon bodies produced from paste briquettes containing 16, 18, 20, 22, 25 and 28% pitch. The withdrawal rate was approximately 12 inches per hour.

TABLE I.—PHYSICAL PROPERTIES OF CARBON BAKED CONTINUOUSLY AT A PULLING RATE OF 12 INCHES PER HOUR

| Sample | Apparent Density, g./cu. cm. | Resistivity, ohms/M./sq. mm. | Compression Strength, lbs./sq. in. |
|---|---|---|---|
| Control [1] | 1.36 | 78 | 3,150 |
| 16% pitch | 1.33 | 83 | 1,660 |
| 18% pitch | 1.31 | 81 | 1,850 |
| 20% pitch | 1.40 | 63 | 3,200 |
| 22% pitch | 1.45 | 60 | 4,300 |
| 25% pitch | 1.51 | 58 | 4,800 |
| 28% pitch | 1.44 | 69 | 3,650 |

[1] Sample containing 20% pitch baked by conventional laboratory procedures.

Experiments using 28% pitch were also successfully carried out with pressure of 36 p.s.i. applied to the paste, and it appears that the pressure need only be sufficient to assure structural integrity and prevent undue porosity in the baked carbon shape.

*Example 2*

As in the preceding example, a charge of paste briquettes was introduced into the molding chamber and placed under pressure by a piston which had been modified to provide an opening therethrough for the passage of a core element or mandrel. A copper tube was fed through the opening and advanced with the charge at substantially the same rate of travel.

In the hottest area of the furnace, the copper tube melted leaving a hollow section of carbon which had been molded and baked in a substantially continuous operation.

This example illustrates that the invention is applicable to formation of hollow shapes through the use of appropriate mold and core combinations. Indeed, the use of a fusible core makes possible the manufacture of shapes having complex internal cavities (as indicated in FIG. 9). Alternatively, a mandrel of such material as mild steel may be fixedly mounted in the mold passageway, or attached to the piston in such manner that it can be withdrawn after the carbon paste has achieved adequate rigidity.

"Finishing temperature" is used herein with reference to the maximum temperature reached in the baking zone, at a position along the longitudinal axis of the carbon body. With a flue temperature of about 1330° C., for example, finishing temperatures in the order of 1260° C. were achieved in the example runs noted above. In general, the withdrawal rate will be at least about one inch per hour and, preferably, from about 8 to about 16 inches per hour.

In the molding operations previously described, the objective is to heat the confined material to set the binder and form a substantially rigid shape. When utilizing carbonizable material in the form of a coke-pitch mixture, this ordinarily requires heating in the temperature range from about 425° C. to about 800° C.; and for continuous operation, we have found it preferable to discharge the material from the exit end of the mold at a temperature in the range from about 500° C. to about 600° C. This seems to provide sufficient rigidity while minimizing the likelihood of encountering binding in the sleeve. For a given sleeve length, furthermore, the necessary control in this regard is afforded by adjusting either or both the rate of movement through the sleeve and the temperature of the heated walls. If binding is observed for a given sleeve length, it is usually sufficient to increase the withdrawal rate; and for a constant withdrawal rate, conversely, the sleeve may simply be shortened. In like manner, if the withdrawal rate necessary to reach the desired temperature in the material at the sleeve exit is too slow, supplemental heating may be applied to increase the temperature; or, alternatively, a longer sleeve may be provided. In general, however, we have found it possible to maintain an adequate sleeve temperature by recuperating heat from the burner system of the baking chamber.

In operating the baking process on a continuous basis, there is also an interrelationship between heating rate, finishing temperature and the length of the baking zone. Faster travel through the zone necessitates more retention time (a longer zone) or higher heating rate (controlled by the burner system) to achieve a given finishing temperature. One of the significant advantages of the invention, however, is the opportunity to use very high finishing temperatures.

While present preferred embodiments of the invention have been illustrated and described, the invention may be otherwise variously embodied and practiced within the scope of the following claims.

We claim:
1. Apparatus for producing a shaped carbon article from carbonizable material containing a thermosetting binder, comprising:
   a molding device having a sleeve member defining a heating and shaping zone;
   means for passing the carbonizable material through said heating and shaping zone while confining such material in the desired shape;
   means for controlling the sleeve temperature to achieve within said zone a temperature high enough to set the thermosetting binder of said material;
   a baking chamber at a discharge end of said sleeve member; and
   burner means for applying hot combustion gases directly against the shaped material emerging from said sleeve member, to carbonize the material as it passes through said baking chamber.

2. Apparatus for producing a shaped carbon article from carbonizable material containing a thermosetting binder, comprising:
   a furnace having a baking chamber;
   burner means to produce a zone of hot combustion gases in said baking chamber;
   a pass-through molding device discharging into said baking chamber;
   means for heating the carbonizable material during its passage through said molding device to set the binder while confining such material in the desired shape; and
   means for withdrawing the shaped article through said zone of combustion gases in the baking chamber.

3. Apparatus according to claim 2, in which said molding device includes an elongated sleeve member having its outlet end located within said baking chamber, said sleeve member being of substantially uniform interior cross-section throughout its length.

4. Apparatus for producing a shaped carbon article, comprising:
   a pass-through molding device for heating and shaping formable material containing a thermosetting binder;
   a furnace having a baking chamber to receive the shaped material emerging from said molding device;
   burner means providing a zone of hot combustion gases in said baking chamber;
   means for moving the material successively through said molding device and said zone of hot combustion gases in the baking chamber;
   means for heating the material during its passage through said molding device to set the binder while confining such material in the desired shape; and
   means for cooling the material as it emerges from said baking chamber to a temperature below its oxidation threshold.

5. Apparatus for producing a shaped article from formable material, comprising:
   a molding device having a passageway therethrough, with an entrance end adapted to receive the formable material and an exit end from which said material is withdrawn as a shaped article, said molding device including a sleeve member defining a heating and shaping zone intermediate the entrance and exit ends of said passageway;
   means for passing the formable material through said heating and shaping zone while confining said material in the desired configuration;
   means for controlling the sleeve temperature to achieve the desired heating effect within said zone;
   spaced walls defining a baking chamber adjacent the exit end of said passageway, said walls extending along and outwardly of said sleeve member to provide a heating jacket for the sleeve;
   burner means to apply combustion gases directly against the shaped material as it passes from said molding device through the baking chamber; and
   means directing combustion gases from the baking chamber through said heating jacket.

6. Apparatus for producing a shaped article from formable material, comprising:
   a furnace having a baking chamber and burner means to produce a zone of hot combustion gases in said chamber;
   a sleeve member providing a pass-through mold discharging into said baking chamber, said sleeve member defining a heating and shaping zone for shaping the formable material;
   spaced walls extending along and outwardly of said sleeve member on opposite sides thereof to provide a heating jacket for the sleeve;
   means directing the combustion products of said burner means through said heating jacket; and
   means for moving the material successively through said sleeve member and said zone of combustion gases in the baking chamber.

References Cited

UNITED STATES PATENTS

| | | |
|---|---|---|
| 1,370,800 | 3/1921 | Egerton. |
| 1,708,124 | 4/1929 | Dedough _____ 25—142 |
| 1,890,802 | 12/1932 | Apple _____ 18—12 |
| 2,143,549 | 1/1939 | Edmonds _____ 18—12 |
| 2,207,412 | 7/1940 | Prouty. |
| 2,215,996 | 9/1944 | Benton _____ 18—13 XR |
| 2,717,420 | 9/1945 | Roy _____ 18—12 |
| 3,119,148 | 1/1964 | Chambers et al. _____ 18—12 |
| 3,212,132 | 10/1965 | Westlake _____ 18—12 |

WILLIAM J. STEPHENSON, *Primary Examiner.*